(12) United States Patent
Hasegawa (10) Patent No.: US 10,698,254 B2
(45) Date of Patent: Jun. 30, 2020

(54) IMAGE DISPLAY PANEL AND IMAGE DISPLAY DEVICE

(71) Applicant: Sharp Kabushiki Kaisha, Sakai, Osaka (JP)

(72) Inventor: Takeshi Hasegawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/351,657

(22) Filed: Mar. 13, 2019

(65) Prior Publication Data

US 2019/0293998 A1  Sep. 26, 2019

(30) Foreign Application Priority Data

Mar. 23, 2018 (JP) .................. 2018-055868

(51) Int. Cl.
*G02F 1/1335* (2006.01)
*G02F 1/1333* (2006.01)

(52) U.S. Cl.
CPC .......... *G02F 1/133528* (2013.01); *G02F 2001/133302* (2013.01); *G02F 2001/133354* (2013.01); *G02F 2201/56* (2013.01)

(58) Field of Classification Search
CPC .......................................... G02F 2001/133354
See application file for complete search history.

(56) References Cited

U.S. PATENT DOCUMENTS

| | | | | |
|---|---|---|---|---|
| 5,850,276 A | * | 12/1998 | Ochi | ................. G02F 1/133526 349/158 |
| 2015/0378487 A1 | * | 12/2015 | Meer | ..................... G06F 1/1643 345/207 |
| 2016/0093684 A1 | * | 3/2016 | Youk | .................... H01L 27/3272 257/40 |
| 2017/0307935 A1 | * | 10/2017 | Park | .................. G02F 1/133536 |

FOREIGN PATENT DOCUMENTS

WO    2007/108244 A1    9/2007

* cited by examiner

*Primary Examiner* — Edmond C Lau
(74) *Attorney, Agent, or Firm* — Keating & Bennett, LLP (57) ABSTRACT

An image display panel includes a glass substrate including a first surface and a second surface opposite from the first surface, a plate member disposed on the second surface, a first alignment mark on the glass substrate, and a second alignment mark on the plate member so as to be positioned with respect to the first alignment mark. One of the glass substrate and the plate member has a non-quadrangular outer shape. The second alignment mark has an area that is 20% or more and 100% or less with respect to an area of the first alignment mark, and the first alignment mark and the second alignment mark are visible from a front.

11 Claims, 8 Drawing Sheets

IMAGE DISPLAY PANEL AND IMAGE DISPLAY DEVICE

CROSS REFERENCE TO RELATED APPLICATION

This application claims priority from Japanese Patent Application No. 2018-055868 filed on Mar. 23, 2018. The entire contents of the priority application are incorporated herein by reference.

TECHNICAL FIELD

The technology described herein relates to an image display panel and an image display device.

BACKGROUND

In a liquid crystal display panel that is an example of an image display panel, at least one of the liquid crystal display panel and a polarizing plate has a plan view shape other than a quadrangular shape. Second alignment marks are formed on the liquid crystal display panel, and each of the second alignment marks is used as a mark for pasting the liquid crystal display panel and the polarizing plate while aligning the second alignment marks with first alignment marks provided on the polarizing plate as a mark for pasting.

A member such as a backlight device for irradiating light to the liquid crystal display panel having the above-described shape other than the quadrangular shape has a shape other than the quadrangular shape similar to the liquid crystal display panel. In a configuration that each of the plan-view shapes of the members such as the liquid crystal display panel and the backlight device is a shape other than the quadrangular shape, such a configuration has no feature in an outer shape such as four corners, a short side and a long side. Thus, there is no mark for pasting such that liquid crystal molecules are aligned with a predetermined orientation and the desired light is transmitted from a light source. In addition, when the members such as the liquid crystal display panel and the backlight device have similar figures, center positions of the members such as the liquid crystal display panel and the backlight device sometimes do not match each other when viewed from a front. For this reason, for example, when the polarizing plate is mounted on the liquid crystal display panel in a positional deviation state, display quality such as contrast of the liquid crystal display panel may be deteriorated.

SUMMARY

The technology described herein was made in view of the above circumstances. An object is to provide an image display panel and an image display device in which alignment accuracy of members is improved.

According to the technology described herein, an image display panel includes a glass substrate including a first surface and a second surface opposite from the first surface, a plate member disposed on the second surface, a first alignment mark on the glass substrate, and a second alignment mark on the plate member so as to be positioned with respect to the first alignment mark. One of the glass substrate and the plate member has a non-quadrangular outer shape. The second alignment mark has an area that is 20% or more and 100% or less with respect to an area of the first alignment mark, and the first alignment mark and the second alignment mark are visible from a front.

In a case where the area of the alignment mark of the glass substrate and the area of the alignment mark of the plate member perfectly coincide with each other, alignment accuracy is highest. Even though the area of the alignment mark of the plate member is small, when the area of the alignment mark of the plate member is 20% or more with respect to the area of the alignment mark of the glass substrate, alignment is performable. In a case of less than 20%, even when each alignment mark is aligned, the second alignment mark inappropriately positions in the first alignment mark, so that the glass substrate and the plate member sometimes insufficiently align each other. Further, when the image display panel is viewed from the front, that is, by allowing the alignment mark to be visible on the completed image display panel, the image display panel is provided with improved design (design of a shape derived from the alignment mark).

According to the technology described herein, an image display device includes an image display panel and an optical member. The image display panel includes a pair of glass substrates that sandwiches a liquid crystal layer and each of which has a first surface at a side of the liquid crystal layer. The image display panel further includes a pair of polarizing plates each of which is disposed at a side of a second surface that is an opposite surface to the first surface of the glass substrate. The optical member is disposed at a side of one of the polarizing plates opposite to the glass substrate. Each of the glass substrates includes at least one first alignment mark on a plane. Each of the polarizing plates includes at least one second alignment mark alignable with the first alignment mark on a plane. The optical member includes a third alignment mark alignable with the first alignment mark and the second alignment mark on a plane. Each of the second alignment marks has an area that is 20% or more and 100% or less with respect to an area of the first alignment mark. When viewed from a front, the first alignment marks, the second alignment marks, and the third alignment mark are visible.

According to the technology described herein, the alignment accuracy is improvable when members of the image display panel and the image display device are pasted to each other.

DETAILED DESCRIPTION

<Image Display Panel>

An exemplary embodiment of the technology described herein will be described hereinafter with reference to the drawings.

Figure 1:
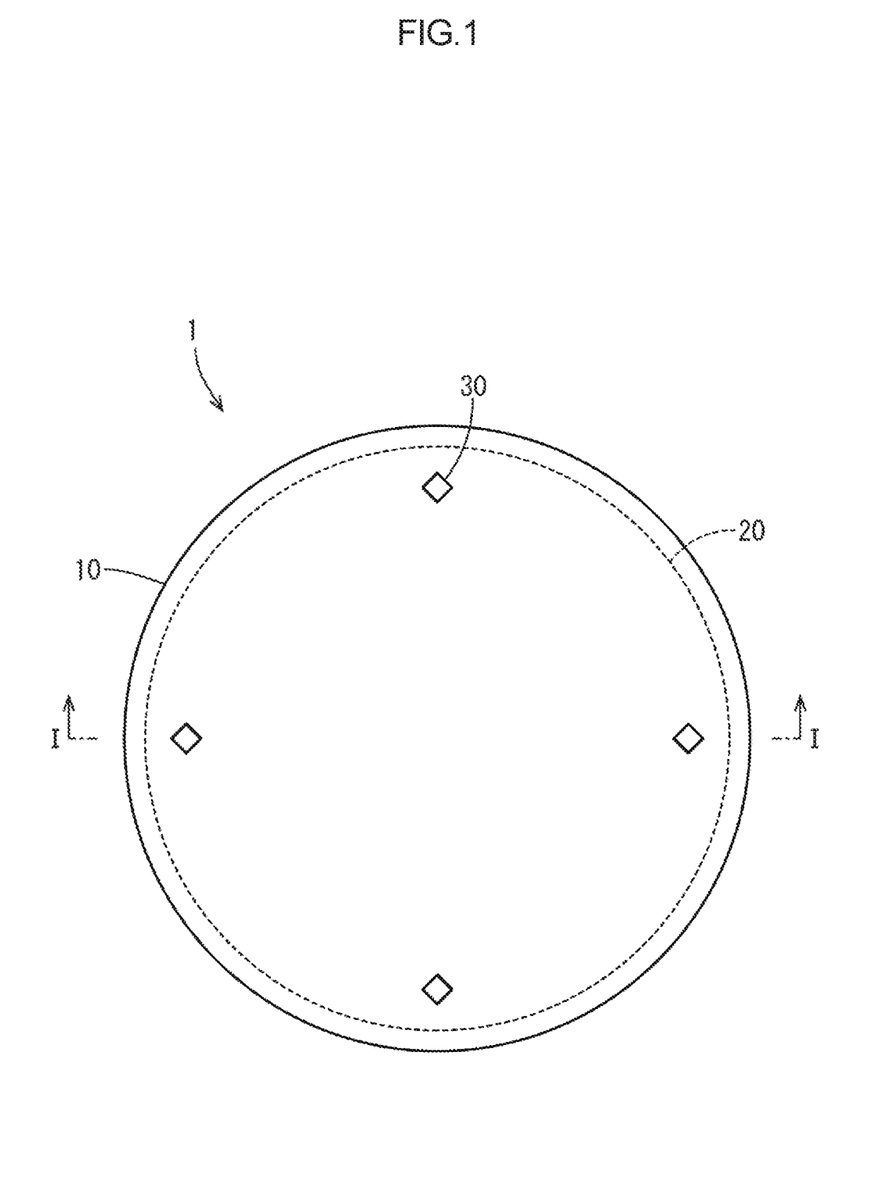
FIG. 1 is a schematic plan view of an image display panel according to an exemplary embodiment.

With reference to FIG. 1, a configuration of an image display panel according to the exemplary embodiment of the technology described herein will be described. An image display panel 1 is usable for a television, a portable electronic device such as a cellular phone and a wearable terminal such as a smart watch, and various liquid crystal display devices such as an on board terminal, for example, a head mounted display, a head up display, a car navigation system, and a tachometer and a radar detector. The image display panel 1 is a liquid crystal panel and includes glass substrates 10 and polarizing plates 20. Each glass substrate 10 and each polarizing plate 20 have alignment marks, and are pasted to each other while being aligned by superimposing the alignment marks. Incidentally, an alignment mark 30 shows a state in which the alignment mark of the glass substrate 10 and the alignment mark of the polarizing plate 20 are superimposed on each other.

As a shape of the image display panel 1, although a front plan-view shape of each of the glass substrate 10 and the polarizing plate 20 is circular, each of the shapes is not limited so long as it is a non-rectangular. When the front plan-view shape of each of the glass substrate 10 and the polarizing plate 20 is non-rectangular, there is no feature of outer shape such as four corners, a short side, and a long side. Thus, there is no mark for pasting such that each of liquid crystal molecules has a predetermined orientation and the desired light is transmitted from a light source. In addition, when the front plan-view shapes of the glass substrate 10 and the polarizing plate 20 are similar figures, center positions of the glass substrate 10 and the polarizing plate 20 are sometimes shifted each other when viewed from a front. By pasting the glass substrate 10 and the polarizing plate 20 using the alignment mark as a mark, when viewed from the front, deviation between center positions and deviation between the glass substrate 10 and the polarizing plate 20 in a rotational direction are prevented.

Figure 2:
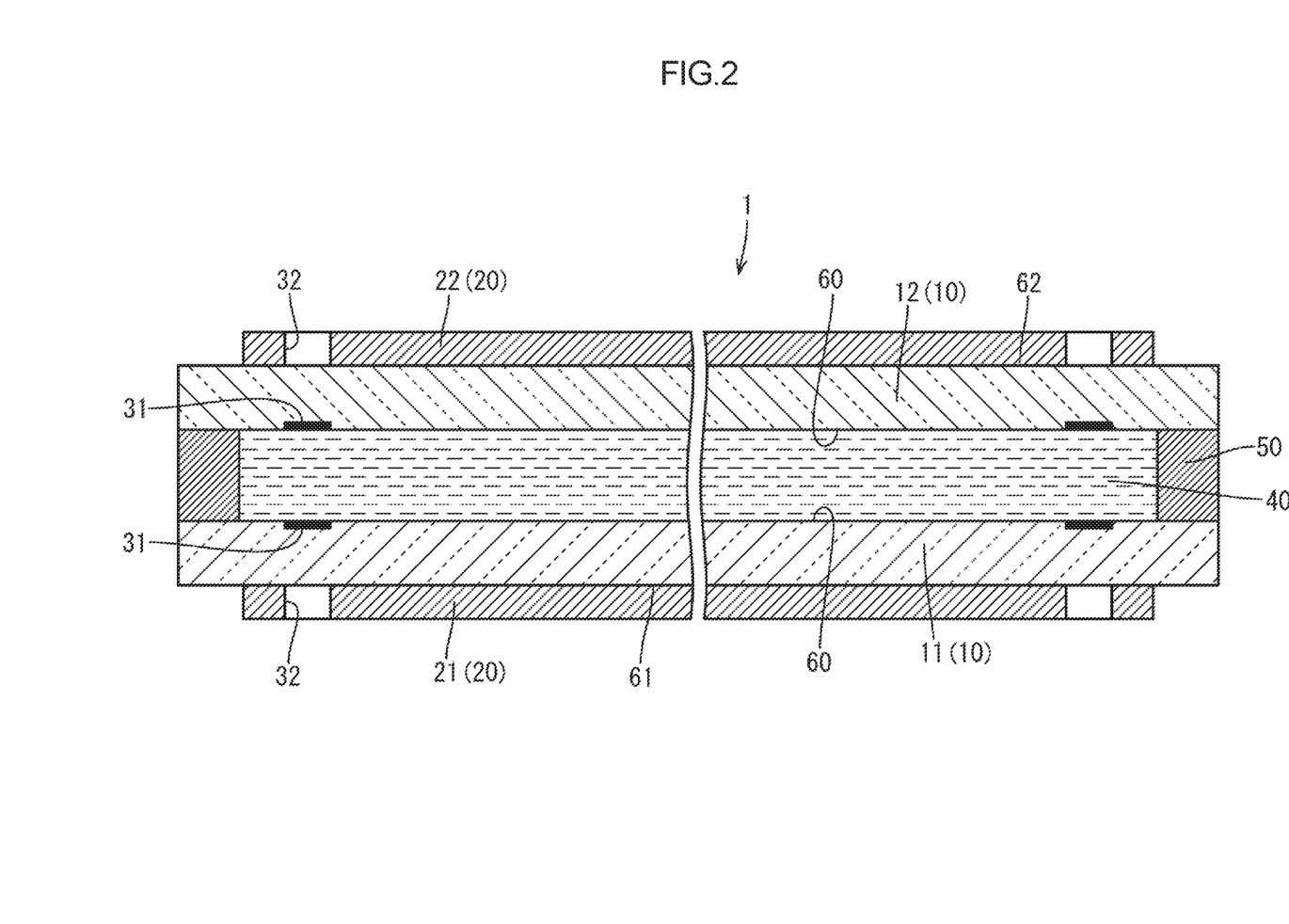
FIG. 2 is a sectional view taken along line I-I of the image display panel shown in FIG. 1.

FIG. 2 is a sectional view taken along line I-I of the image display panel 1 of FIG. 1. The image display panel 1 according to the present exemplary embodiment includes, in addition to a thin film transistor (TFT) substrate 11 and a color filter (CF) substrate 12 which are glass substrates, a TFT substrate side polarizing plate 21, a CF substrate side polarizing plate 22, a liquid crystal layer 40, and a sealing material 50, and further includes an alignment film not shown.

On the TFT substrate 11, TFTs that are switching elements, pixel electrodes, source bus lines, gate bus lines, insulating films, and the like not shown are further formed. The TFT substrate 11 has a first surface 60 and a second surface 61, the alignment film is arranged on a side of the first surface 60 of the TFT substrate, and the TFT substrate is in contact with the liquid crystal layer 40 via the alignment film. The second surface 61 of the TFT substrate 11 is a surface that is not in contact with the liquid crystal layer 40, and the second surface 61 and the TFT substrate side polarizing plate 21 are in contact with each other. Each of first alignment marks 31 is formed using, for example, the insulating film, a metal film, or the like formed on the TFT substrate 11.

On the CF substrate 12, a black matrix, a coloring material and a transparent electrode not shown are formed. The CF substrate 12 has a first surface 60 and a second surface 62, the alignment film is disposed on a side of the first surface 60 of the CF substrate, and the CF substrate 12 is in contact with the liquid crystal layer 40 via the alignment film. The second surface 62 of the CF substrate 12 is a surface that is not in contact with the liquid crystal layer 40, and the second surface 62 and the CF substrate side polarizing plate 22 are in contact with each other.

Each of first alignment marks 31 formed on the first surface 60 of the CF substrate 12 is mainly formed on the black matrix of the CF substrate 12. That is, when patterning of the black matrix is performed on the CF substrate 12, the patterning is performed such that a black matrix non-forming region is formed in a part of a black matrix forming region. The black matrix non-forming region formed by the patterning becomes the first alignment mark 31 of the CF substrate 12.

The sealing material 50 is applied to a portion corresponding to an outer periphery of the CF substrate 12, and the liquid crystal layer 40 is dropped into a space surrounded by the sealing material 50. The TFT substrate 11 and the CF substrate 12 are pasted to each other such that the first alignment mark 31 of the TFT substrate 11 formed at a position corresponding to the first alignment mark 31 of the CF substrate 12 is superimposed on the first alignment mark 31 of the CF substrate 12.

On each of the TFT substrate side polarizing plate and the CF substrate side polarizing plate 22, second alignment marks 32 are formed. Each of the second alignment marks 32 is formed by, for example, providing a slit in each of the TFT substrate side polarizing plate 21 and the CF substrate side polarizing plate 22 and opening a part of each of the TFT substrate side polarizing plate 21 and the CF substrate side polarizing plate 22. By superimposing each of the second alignment marks 32 of the TFT substrate side polarizing plate 21 formed by the opening on the first alignment mark 31 of the TFT substrate 11, the TFT substrate 11 and the TFT substrate side polarizing plate 21 are pasted to each other while aligning both of them. Likewise, the CF substrate 12 and the CF substrate side polarizing plate 22 are pasted to each other. The display panel 1 includes an image display region and an image non-display region on an outer periphery of the image display region. An image is displayed on the display region and no image is displayed on the image non-display region. The image non-display region is outside the polarizing plate 20. The first alignment marks 31 and the second alignment marks 32 are formed in the image non-display region.

A relationship between the first alignment mark 31 and the second alignment mark 32 will be described with reference to FIGS. 3A to 3D.

Figure 3A:
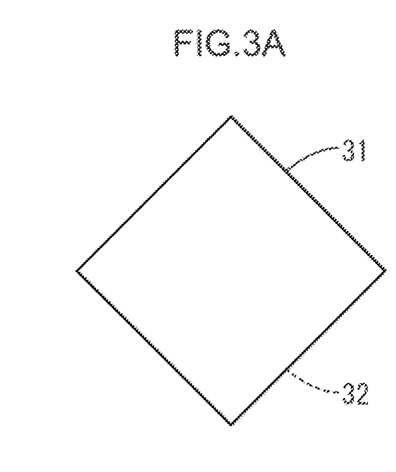
FIGS. 3A to 3D are views illustrating examples of relationship between a first alignment mark and a second alignment mark of the image display panel according to the exemplary embodiment.

As shown in FIGS. 3A to 3D, the first alignment marks 31 and the second alignment marks 32 are superimposed respectively. As shown in FIG. 3A, when a shape and an area of the first alignment mark 31 are equal to those of the second alignment mark 32, each of the second alignment marks 32 is superimposed on the first alignment marks 31 along an outline of the shape of each first alignment mark 31. At this time, the second alignment mark 32 of the TFT substrate side polarizing plate 21 and the second alignment mark 32 of the CF substrate side polarizing plate 22 are superimposed so as to coincide, so that the light from the light source easily passes through. Further, by confirming how the light from the light source passes through the superimposed alignment mark 30, it is determined whether or not the TFT substrate 11, the CF substrate 12, the TFT substrate side polarizing plate 21, and the CF substrate side polarizing plate 22 are properly pasted.

Figure 3B:
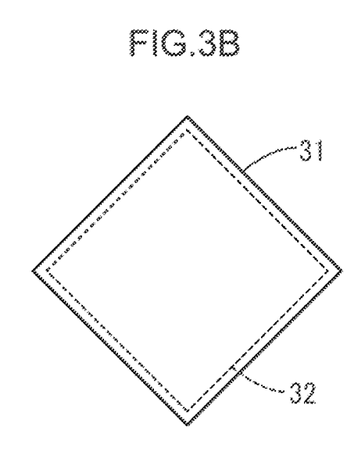
Figure 3C:
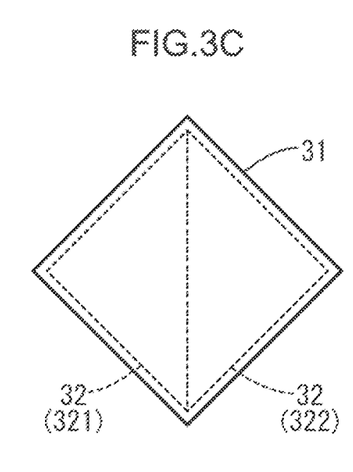
Figure 3D:
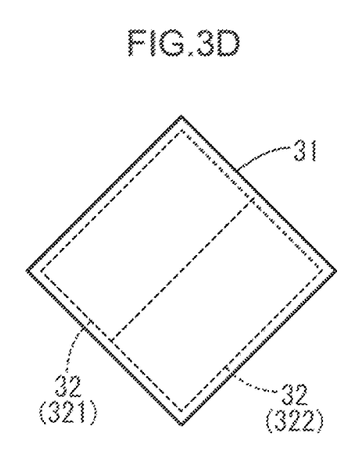

As shown in FIGS. 3B to 3D, when a size of the first alignment mark 31 is different from a size of the second alignment mark 32, each of the second alignment marks 32 is superimposed on the first alignment marks 31 such that the second alignment marks 32 are arranged within the outline of each first alignment mark 31. As shown in FIG. 3B, when the shape of the first alignment mark 31 and the shape of the second alignment mark 32 are similar figures, each of the second alignment marks 32 may be superimposed on the first alignment marks 31 such that the second alignment marks 32 are arranged within the outline of the shape of each first alignment mark 31.

As shown in FIGS. 3C and 3D, when the shape of the first alignment mark 31 and the shape of each of the second alignment marks 32 are non-similar figures, a method of superposition depends on the shape of the second alignment mark 32. In FIGS. 3C and 3D, a case in which the second alignment mark 32(321) of the TFT substrate side polarizing plate 21 and the second alignment mark 32(322) of the CF substrate side polarizing plate 22 are arranged within the outline of each first alignment mark 31 to be adjacent to each other is shown. At this time, the second alignment marks 321, 322 adjacent to each other may partially overlap each other.

It is preferable that the area of the second alignment mark 32 is smaller than or equal to the area of the first alignment mark 31. Specifically, in a case of an arrangement shown in FIG. 3A, the area of the second alignment mark 32 is equal to the area of the first alignment mark 31. In a case of an arrangement shown in FIG. 3B, the area of the second alignment mark 32 is 20% or more and 100% or less, preferably 50% or more and 100% or less, more preferably 85% or more and 100% or less, with respect to the area of the first alignment mark 31. When the area of each of the second alignment marks 32 with respect to the area of the first alignment mark 31 is within the above ranges, a center of the first alignment mark 31 and a center of the second alignment mark 32 are easily superimposed, so that alignment accuracy is improved.

In a case of an arrangement shown in FIGS. 3C and 3D, the area of each of the second alignment marks 32 of the TFT substrate side polarizing plate 21 and the CF substrate side polarizing plate 22 is 20% or more and 100% or less, preferably 40% or more and 80% or less, more preferably 45% or more and 60% or less with respect to the area of the first alignment mark 31. When the area of each of the second alignment marks 32 is within the above ranges, the second alignment mark 32(321) of the TFT substrate side polarizing plate 21 and the second alignment mark 32(322) of the CF substrate side polarizing plate 22 are arranged so as to be adjacent to each other, so that the alignment accuracy is improved. At this time, the second alignment mark 32 of the TFT substrate side polarizing plate 21 and the second alignment mark 32 of the CF substrate side polarizing plate 22 may be arranged so as to partially overlap each other. By confirming an overlap portion, it is determined whether or not the proper alignment is performed.

A relationship between the TFT substrate side polarizing plate 21, the CF substrate side polarizing plate 22, and the liquid crystal layer 40 will be described hereinafter. The TFT substrate side polarizing plate 21 and the CF substrate side polarizing plate 22 have peculiar transmission axes each other. In a case in which the TFT substrate side polarizing plate 21 and the CF substrate side polarizing plate 22 are arranged in a cross nicol state where the transmission axes thereof are orthogonal to each other, when voltage is not applied to the pixel electrodes, the image display panel becomes a normally black mode that performs a black display. On the other hand, in the liquid crystal layer 40, when the voltage is applied, the orientations of the liquid crystal molecules in the liquid crystal layer 40 change. Thus, when the voltage is applied, the TFT substrate side polarizing plate 21 and the CF substrate side polarizing plate 22 need to be pasted on the TFT substrate and the CF substrate respectively such that the transmission axes of the TFT substrate side polarizing plate 21 and the CF substrate side polarizing plate 22 and orientation directions of the liquid crystal molecules have appropriate relationship.

In the image display panel 1 according to the exemplary embodiment of the technology described herein, the TFT substrate 11, the CF substrate 12, the TFT substrate side polarizing plate 21, and the CF substrate side polarizing plate 22 are pasted together such that the first alignment marks 31 of the TFT substrate 11 and the CF substrate 12 and the second alignment marks 32 of the TFT substrate side polarizing plate 21 and the CF substrate side polarizing plate are superimposed on each other. Thus, when the image display panel 1 is viewed from the front, the deviation between the center positions of the TFT substrate 11, the CF substrate 12, the TFT substrate side polarizing plate 21, and the CF substrate side polarizing plate 22 and generation of the deviation in each rotational direction are prevented. As a result, the transmission axes of the TFT substrate side polarizing plate 21 and the CF substrate side polarizing plate and the orientation directions of the liquid crystal molecules in the liquid crystal layer 40 have the appropriate relationship, so that the image display panel that is excellent in display quality such as contrast and chromaticity is provided.

<Image Display Device>

An image display device will be described with reference to FIG. 4. A portion duplicating with the description of the image display panel is omitted.

Figure 4:
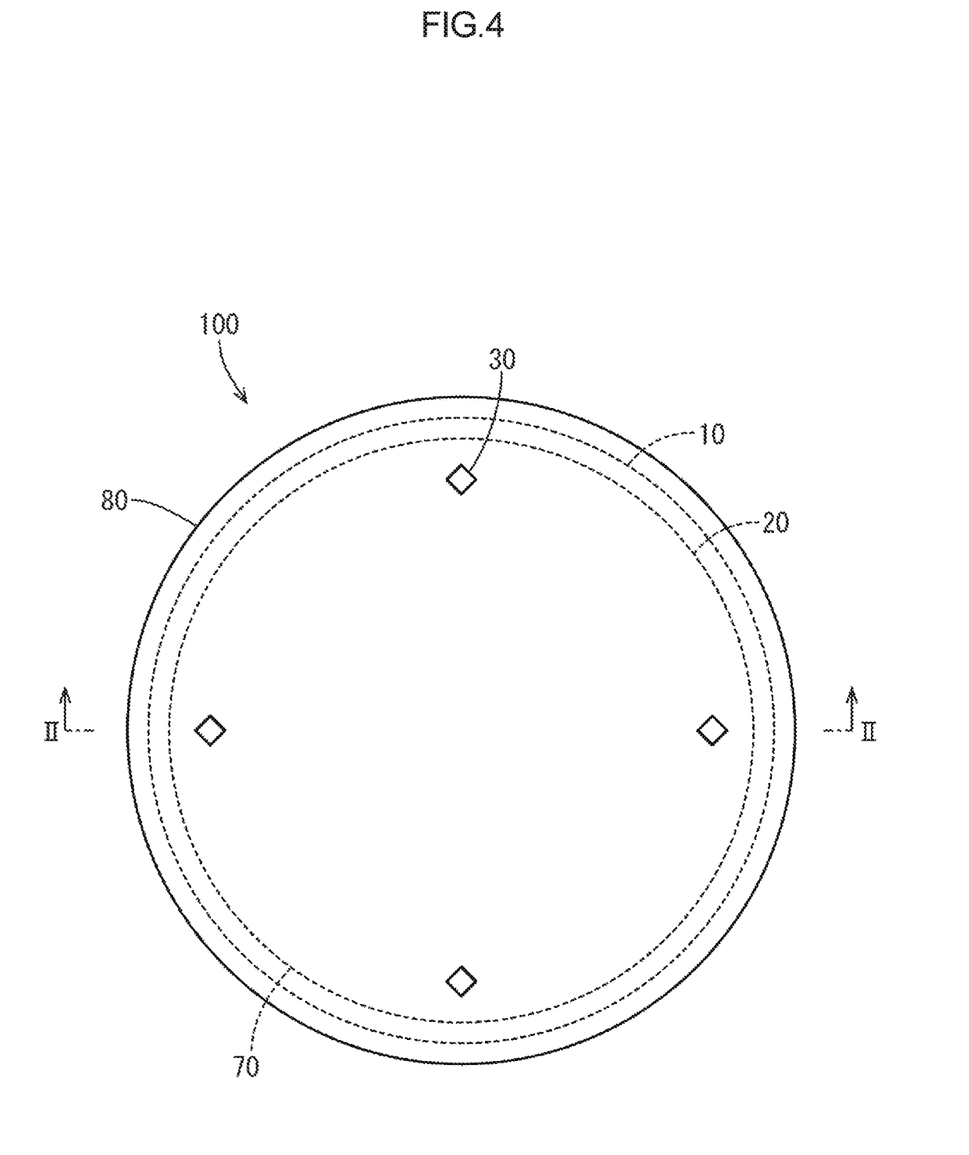
FIG. 4 is a schematic plan view of an image display device according to the exemplary embodiment.

As shown in FIG. 4, an image display device 100 is a liquid crystal display device, and includes the image display panel 1 including the glass substrates 10 and the polarizing plates 20, an optical member 70, and a protective member 80. Each of the glass substrate 10, the polarizing plate 20, the optical member 70, and the protective member 80 has the alignment marks, and the alignment marks are superimposed on each other, so that the glass substrates 10, the polarizing plates 20, the optical member 70, and the protective member 80 are pasted to each other while they are aligned. Incidentally, the alignment mark 30 shows a state in which the alignment marks included in the members each of which constitutes the image display device 100 are superimposed on each other. As a shape of the image display device 100, although a front plan-view shape of each of the glass substrate 10, the polarizing plate 20, the optical member 70, and the protective member 80 is circular, each of the shapes is not limited so long as it is the non-rectangular shape.

The optical member 70 and the protective member 80 are further pasted to the image display panel 1 having the alignment marks 30. At this time, the image display panel 1, the optical member 70, and the protective member 80 are pasted to each other such that alignment marks 33 of the optical member 70 are superimposed on the alignment marks 30 respectively. In other words, the alignment marks 30 of the image display panel 1 and the alignment marks 33 of the optical member 70 are superimposed in a vertical direction. By doing so, when viewed from the front, the generation of the deviation between the center positions of the image display panel 1, the optical member 70, and the protective member 80 and the deviation of each member in the rotational direction are prevented.

Figure 5:
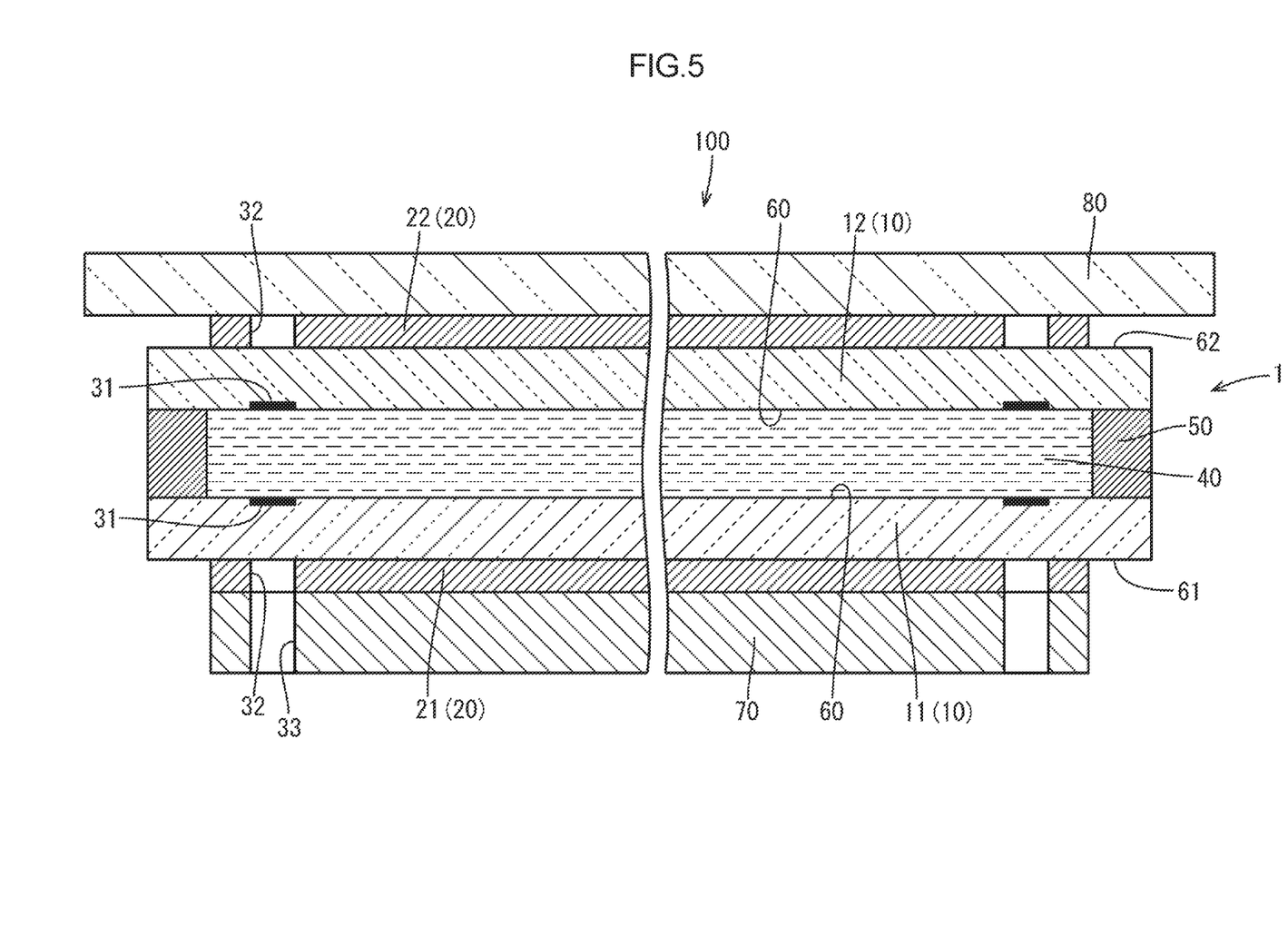
FIG. 5 is a sectional view taken along line II-II of the image display device shown in FIG. 4.

FIG. 5 is a sectional view taken along line II-II of the image display device 100 shown in FIG. 4. The image display device 100 according to the present exemplary embodiment includes the image display panel 1, the optical member 70, and the protective member 80. The image display panel 1 is composed of the TFT substrate 11, the CF substrate 12, the liquid crystal layer 40, the TFT substrate side polarizing plate 21, and the CF substrate side polarizing plate 22. As described above, the TFT substrate 11 and the CF substrate 12 each having the first surface 60 that is in contact with the liquid crystal layer 40 are in contact with the TFT substrate side polarizing plate 21 and the CF substrate side polarizing plate 22 respectively at the second surfaces 61, 62 provided on opposite sides to the first surfaces 60. At this time, the TFT substrate 11 and the TFT substrate side polarizing plate 21 are aligned by superimposing the first alignment marks 31 of the TFT substrate 11 and the second alignment marks 32 of the TFT substrate side polarizing plate 21.

The optical member 70 is located below the TFT substrate side polarizing plate 21 and above or adjacent to the light source not shown, and constitutes a backlight device. As the light source, a light emitting diode (LED), an electro luminescence (EL), or the like is taken, and it may be arranged in an edge light system or a direct under type system. For example, in a case in which the optical member 70 is in the edge light system, the optical member 70 further includes a light guiding plate for guiding the light from the light source not shown and emitting the light as planar light. Further, an optical sheet or the like that is arranged to be superimposed on a front side of the light guiding plate and imparts a light condensing function, a diffusion effect or the like to the light emitted from the light guiding plate is provided. As the optical sheet, a light condensing sheet that includes a prism sheet whose light condensing function is limited to a specific direction and that imparts the light condensing function, or a diffusion sheet that exerts the diffusion effect as an optical action, or the like are taken. Incidentally, in a case of the direct under type, the optical member 70 is commonly configured to have no light guiding plate. Thus, the optical member 70 is appropriately selectable according to the arrangement of the light source.

The optical member 70 has third alignment marks 33 each of which is formed by opening a part of the optical member 70 with provision of a slit or the like. The third alignment marks 33 formed on the optical member 70 and the second alignment marks 32 of the TFT substrate side polarizing plate 21 are superimposed respectively, so that the optical member 70 is aligned with the image display panel 1. At this time, the alignment marks 30 of the image display panel 1 and the third alignment marks 33 of the optical member are superimposed respectively. By pasting the image display panel 1 and the optical member 70 as described above, when viewed from the front, the deviation between the center positions of each other and the generation of the deviation in each rotational direction are prevented.

The protective member 80 is, for example, a cover glass and disposed on the CF substrate side polarizing plate 22, so that the protective member 80 is positioned on an outermost surface of the image display device 100 to protect each member constituting the image display device 100 from an external impact or the like.

A relationship between the first alignment mark, the second alignment mark, and the third alignment mark will be described with reference to FIGS. 6A to 6D.

Figure 6A:
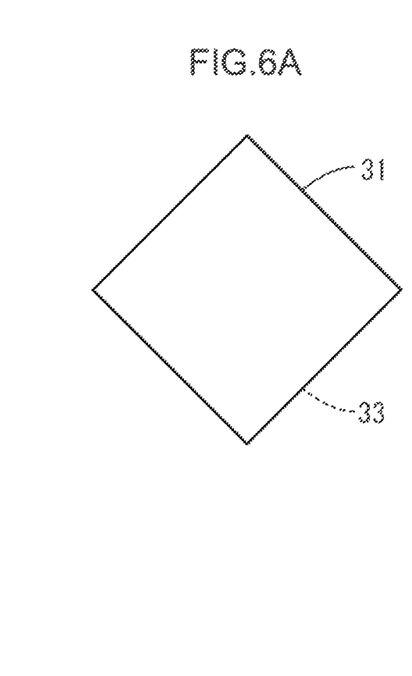
FIGS. 6A to 6D are views illustrating examples of relationship between the first alignment mark, the second alignment mark, and a third alignment mark of the image display device according to the exemplary embodiment.

As shown in FIG. 6A, when the shapes and the areas of the first alignment mark 31, the second alignment mark 32, and the third alignment mark 33 are equal to each other, the third alignment mark 33 of the optical member 70 is superimposed on the alignment mark 30 of the image display panel 1 along an outline of the alignment mark 30. At this time, the third alignment mark 33 is superimposed on the alignment mark 30 of the image display panel 1 so as to coincide with the alignment mark 30, so that the light from the light source easily passes through. Further, by confirming how the light from the light source passes through the alignment mark 30 in a state where the image display panel 1 and the optical member 70 are pasted to each other, it is determined whether or not the image display panel 1 and the optical member 70 are properly pasted. That is, when the alignment mark 30 of the image display panel 1 and the third alignment mark 33 of the optical member 70 are shifted each other, it turns out that the center positions of the image display panel 1 and the optical member 70 are shifted each other, or the deviation is generated in each of the rotational directions.

Figure 6B:
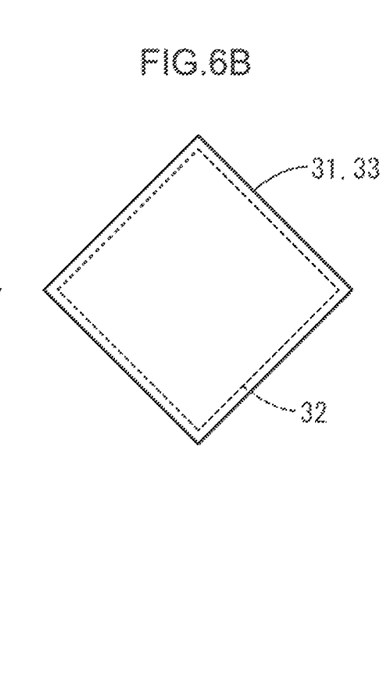

FIG. 6B illustrates a case where the shapes and the areas of the first alignment mark 31 and the third alignment mark 33 are equal to each other and the area of the second alignment mark 32 is the smallest. At this time, the first alignment marks 31 and the third alignment mark 33 are arranged so as to coincide with each other. However, the second alignment mark 32 may be arranged anywhere within an outline of each of the first alignment marks 31 and the third alignment mark 33, and does not coincide with the first alignment marks and the third alignment mark 33.

Figure 6C:
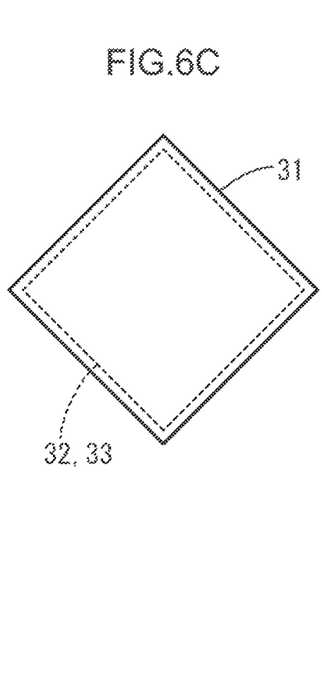

FIG. 6C illustrates a case where the shapes and the areas of the second alignment mark 32 and the third alignment mark 33 are equal to each other and the area of the first alignment mark 31 is the largest. At this time, when the image display panel 1 is formed, the image display panel 1 is formed such that each of the second alignment marks 32 is disposed within the outline of the shape of each first alignment mark 31. Then, when the optical member 70 is pasted on the TFT substrate side polarizing plate 21 of the image display panel 1, the third alignment mark 33 of the optical member 70 is superimposed on the second alignment marks 32 along an outline of the shape of the second alignment mark 32 of the TFT substrate side polarizing plate 21. By doing so, the second alignment marks 32 and the third alignment mark 33 are arranged in the outline of each first alignment mark 31 having the largest area.

Figure 6D:
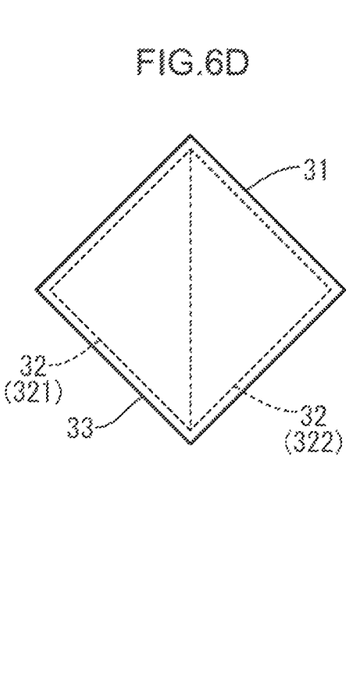

FIG. 6D illustrates a case where the first alignment mark 31 and the third alignment mark 33 are similar to each other, the second alignment marks 32 are non-similar to the first alignment marks 31 and the third alignment mark 33, and the area of the first alignment mark 31 is the largest.

As shown in FIG. 6D, the second alignment marks 32 and the third alignment mark 33 are arranged within the outline of the shape of each first alignment mark 31. As described above, in the image display panel 1, the TFT substrate side polarizing plate 21 and the CF substrate side polarizing plate 22 are respectively pasted on the opposite surfaces to the first surfaces 60 of the TFT substrate 11 and the CF substrate 12 that sandwich the liquid crystal layer 40 with the first surfaces 60 via the sealing material 50. At this time, a pair of the substrates 11, 12 and a pair of the polarizing plates 21, 22 are pasted to each other such that the first alignment marks 31 formed on the first surfaces 60 and the second alignment marks 32 of the TFT substrate side polarizing plate 21 and the CF substrate side polarizing plate 22 are superimposed to each other. At this time, the second alignment mark 32 (321) of the TFT substrate side polarizing plate 21 and the second alignment mark 32 (322) of the CF substrate side polarizing plate 22 are arranged to be adjacent to each other along the outline of each first alignment mark 31. The optical member 70 having the third alignment marks 33 is pasted to the image display panel 1 formed as described above. The third alignment mark 33 is superimposed along the outlines of the two second alignment marks 32 (321, 322) arranged along the outline of each first alignment mark 31. In this way, the second alignment marks 32 (321, 322) and the third alignment mark 33 are arranged within the outline of each first alignment mark 31, and, in a direction perpendicular to the plane direction (in a front plan view with respect to the glass substrate), the alignment mark 30 in a state where the first alignment mark 31 to the third alignment mark 33 are superimposed is formed.

It is preferable that the area of the second alignment mark 32 is less than or equal to the area of the first alignment mark 31 and the area of the third alignment mark 33. Specifically, in a case of an arrangement of FIG. 6A, the area of the second alignment mark 32 is equal to the area of the first alignment mark 31 and the area of the third alignment mark 33. In a case of an arrangement of FIG. 6B, the area of the second alignment mark 32 is 20% or more and 100% or less, preferably 50% or more and 100% or less, more preferably 85% or more and 100% or less, with respect to the area of the first alignment mark 31 and the area of the third alignment mark 33. When the area of each of the second alignment marks 32 with respect to the area of the first alignment mark 31 is within the above ranges, centers of the first alignment mark 31 and the third alignment mark 33 and a center of the second alignment mark 32 are easily superimposed, so that the alignment accuracy is improved.

In a case of an arrangement of FIG. 6C, each of the areas of the second alignment mark 32 and the third alignment mark 33 is 20% or more and 100% or less, preferably 50% or more and 100% or less, more preferably 85% or more and 100% or less, with respect to the area of the first alignment mark 31. When the area of each of the second alignment mark 32 and the third alignment mark 33 is within the above ranges, the center of the first alignment mark 31 and the centers of the second alignment mark 32 and the third alignment mark 33 are easily superimposed, so that the alignment accuracy is improved.

In a case of an arrangement of FIG. 6D, the sum of the both areas of the second alignment marks 32 (321, 322) of the TFT substrate side polarizing plate 21 and the CF substrate side polarizing plate 22 is equal to the area of the third alignment mark 33. The area of each of the second alignment marks 32 (321, 322) of the TFT substrate side polarizing plate 21 and the CF substrate side polarizing plate 22 is 20% or more and 100% or less, preferably 40% or more and 80% or less, more preferably 45% or more and 60% or less, with respect to the area of the first alignment mark 31. When the area of each of the second alignment marks 32 is within the above ranges, the second alignment mark 321 of the TFT substrate side polarizing plate 21 and the second alignment mark 322 of the CF substrate side polarizing plate 22 are arranged so as to be adjacent to each other, so that the alignment accuracy is improved. At this time, the second alignment mark 321 of the TFT substrate side polarizing plate 21 and the second alignment mark 322 of the CF substrate side polarizing plate 22 may be arranged so as to partially overlap each other. By confirming an overlap portion, it is determined whether or not the proper alignment is performed. The center of the second alignment mark 321 of the properly aligned TFT substrate side polarizing plate 21 and the center of the third alignment mark 33 are superimposed, so that the first alignment mark 31, the second alignment mark 32, and the third alignment mark 33 are accurately superimposed.

Figure 7:
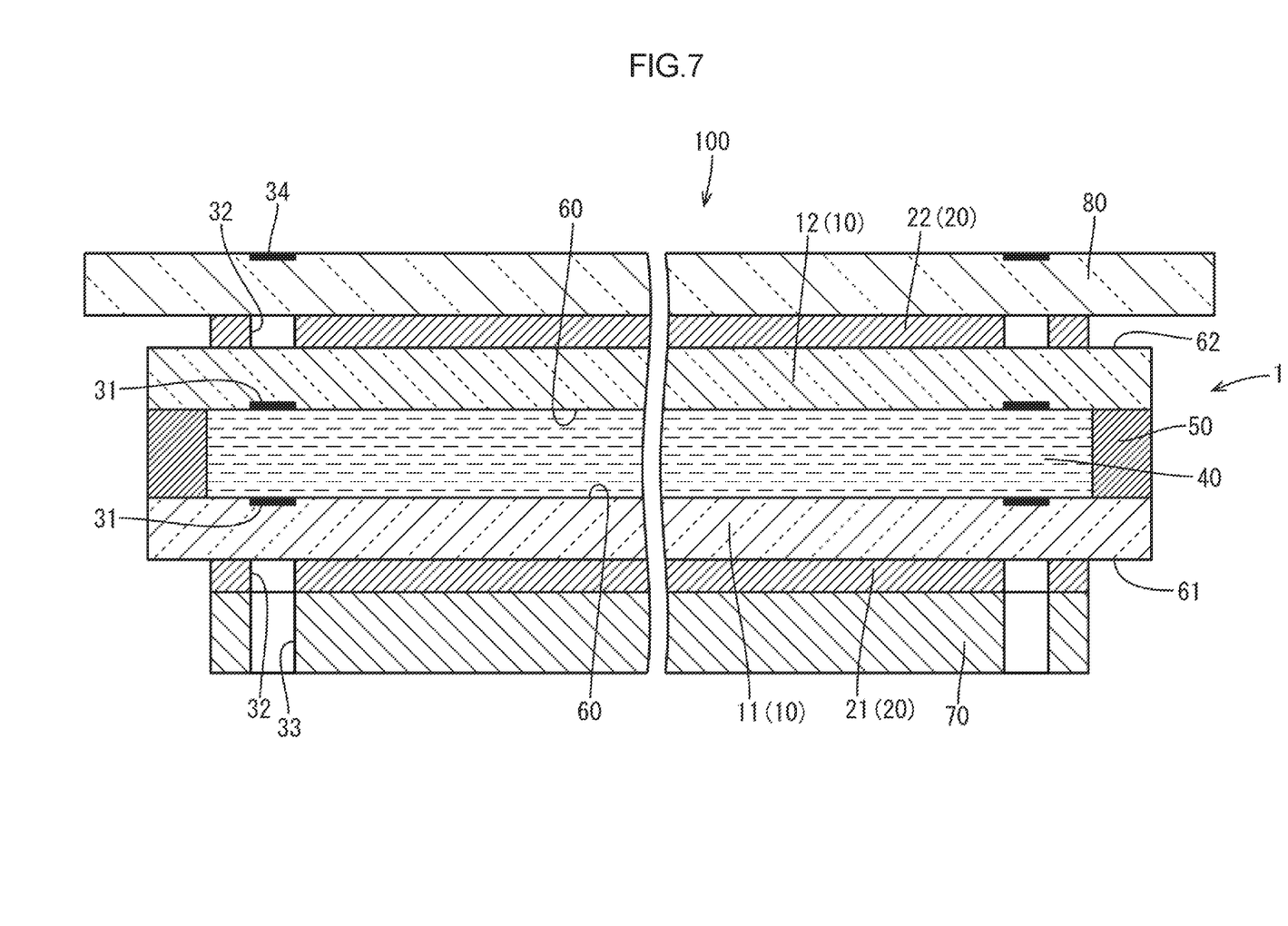
FIG. 7 is a modified example of the sectional view taken along line II-II of the image display device shown in FIG. 4.

FIG. 7 is a modified example of the sectional view taken along line II-II of the image display device of FIG. 4. Although the image display device 100 according to the present exemplary embodiment will be described with reference to FIG. 7, a description duplicating with the description with respect to the sectional view of FIG. 5 will be omitted. As shown in FIG. 7, the protective member 80 of the image display device 100 may have fourth alignment marks 34, and each of the fourth alignment marks 34 is provided by, for example, changing surface roughness or coloring with paint or the like. In this case, the protective member 80 is pasted to the CF substrate side polarizing plate 22 such that each of the fourth alignment marks 34 is superimposed on the first alignment marks 31, the second alignment marks 32, and the third alignment mark 33. A shape of the fourth alignment mark 34 may be equal to or different from the shape of each of the first alignment mark 31, the second alignment mark 32, and the third alignment mark 33. An area of the fourth alignment mark 34 may be equal to or different from the area of each of the first alignment mark 31, the second alignment mark 32, and the third alignment mark 33.

Variations of the alignment marks will be described with reference to FIGS. 8A to 8D.

As shown in FIGS. 8A to 8D, the shapes and the sizes of the areas of the first alignment mark 31, the second alignment mark 32, the third alignment mark 33, and the fourth alignment mark 34 may take various forms, and are not limited to the above-described rectangle. That is, the shapes of the first alignment mark 31, the second alignment mark 32, the third alignment mark 33, and the fourth alignment mark 34 may be equal to or different from each other and are appropriately selectable. As the shapes of the first alignment mark 31, the second alignment mark 32, the third alignment mark 33, and the fourth alignment mark 34, for example, polygonal shapes such as triangles, quadrangles and pentagons, circles or ellipses, numbers such as Arabic numerals or Roman numerals, letters such as Greek alphabets or alphabets, symbols such as arrows, crosses or star shapes, or the like, and combinations thereof are taken. It is preferable that the area of the first alignment mark 31 is the largest as the areas of the first alignment mark 31, the second alignment mark 32, the third alignment mark 33, and the fourth alignment mark 34. When the area of the first alignment mark 31 is the largest, the first alignment mark 31, the second alignment mark 32, the third alignment mark 33, and the fourth alignment mark 34 are easily superimposed on each other, so that each member is appropriately pasted. As a result, when viewed from the front, the deviation between the center positions and in the rotational direction of each member is prevented, and the image display device that is excellent in the display quality such as the contrast and the chromaticity is provided.

Figure 8A:
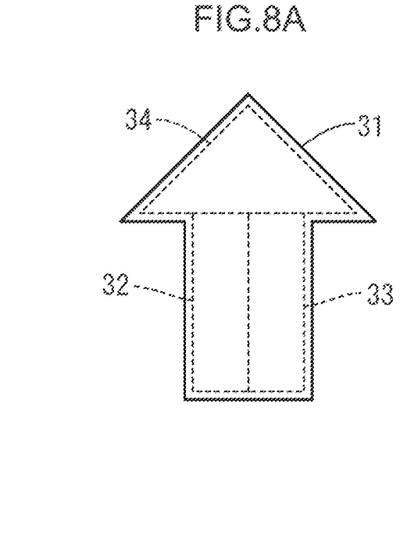
FIGS. 8A to 8D are views illustrating examples of variations of the first alignment mark, the second alignment mark, the third alignment mark, and the fourth alignment mark according to the exemplary embodiment.

FIG. 8A illustrates an example of the alignment mark including the arrow-shaped first alignment mark 31, the rectangular second alignment mark 32 and the rectangular third alignment mark 33 accommodated inside a rectangular portion of the first alignment mark 31 and adjacent to each other in the front plan view, and the triangular fourth alignment mark 34 accommodated inside a triangular portion of the first alignment mark 31. In this case, when the image display device 100 is viewed from the front, the arrow-shaped alignment mark is recognizable as a design.

Figure 8B:
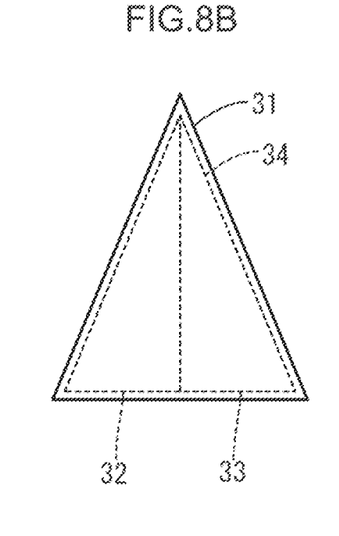

FIG. 8B illustrates an example of the alignment mark including the triangular first alignment mark 31, the fourth alignment mark 34 that is accommodated inside the first alignment mark 31 and that has a similar figure to the first alignment mark 31, and the triangular second alignment mark 32 and the triangular third alignment mark 33 accommodated inside the first alignment mark 31 and adjacent to each other in the front plan view. Then, a triangle formed by combining the second alignment mark 32 and the third alignment mark 33 has the same shape as the fourth alignment mark 34, and the triangle and the fourth alignment mark 34 are superimposed on each other. In this case, when the image display device 100 is viewed from the front, the triangular alignment mark is recognizable as a design.

Figure 8C:
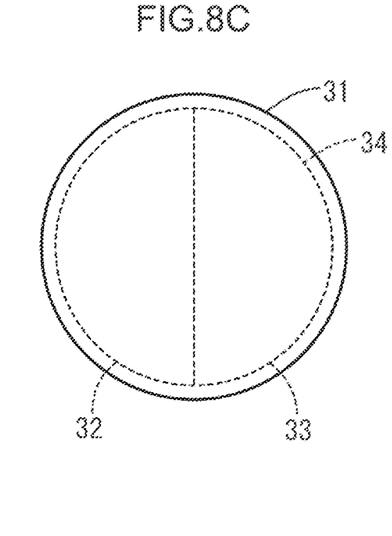

FIG. 8C illustrates an example of the alignment mark including the circular first alignment mark 31, the fourth alignment mark 34 that is accommodated inside the first alignment mark 31 and that has a similar figure to the first alignment mark 31, and the semicircular second alignment mark 32 and the semicircular third alignment mark 33 accommodated inside the first alignment mark 31 and adjacent to each other in the front plan view. Then, a circle formed by combining the second alignment mark 32 and the third alignment mark 33 has the same shape as the fourth alignment mark 34, and the circle and the fourth alignment mark 34 are superimposed on each other. In this case, when the image display device 100 is viewed from the front, the circular alignment mark is recognizable as a design.

Figure 8D:
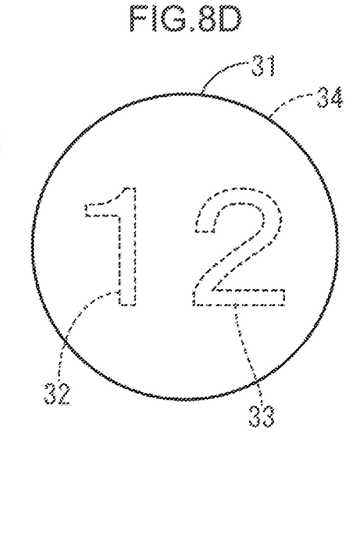

FIG. 8D illustrates an example of the alignment mark including the circular first alignment mark 31, the fourth alignment mark 34 that is within and superimposed on the first alignment mark 31 and that has the same shape as the first alignment mark 31, and the number "1"-shaped second alignment mark 32 and the number "2"-shaped third alignment mark 33 accommodated inside the first alignment mark 31 and adjacent to each other in the front plan view. Then, a number "12" formed by combining the second alignment mark 32 and the third alignment mark 33 is located in a circle configured by superimposing the first alignment mark 31 and the fourth alignment mark 34. In this case, when the image display device 100 is viewed from the front, the alignment mark in which the numbers are included in the circular shape is recognizable as a design.

In the image display device 100 according to the present exemplary embodiment, the alignment mark 30 shows a state in which the first alignment mark 31, the second alignment mark 32, the third alignment mark 33, and the fourth alignment mark 34 are superimposed (see FIG. 4). As shown in FIG. 7, the first alignment mark 31, the second alignment mark 32, the third alignment mark 33, and the fourth alignment mark 34 are superimposed in the vertical direction. That is, the first alignment mark 31, the second alignment mark 32, the third alignment mark 33, and the fourth alignment mark 34 are not formed on the same plane each other. At this time, as shown in FIGS. 4 and 7, when the image display device 100 is viewed from the front, it is confirmed that at least one or more superimposed alignment marks 30 are present on the same plane of the protective member 80. When a specific design shape is given to the superimposed alignment mark, by visually confirming the specific shape of one alignment mark 30, it is confirmed that the image display panel 1, the optical member 70, and the protective member 80 constituting the image display device 100 are accurately pasted to each other. Further, when there are two or more alignment marks 30 on the same plane of the protective member 80, regardless of the shapes of the alignment marks 30, it is confirmed that the image display panel 1, the optical member 70, and the protective member 80 constituting the image display device 100 are accurately pasted to each other. The number of the alignment marks 30 is appropriately selectable. However, at least one or more is preferable, more preferably two or more, and further preferably three or more. When the number of the alignment marks 30 is within the above ranges, the transmission axes of the TFT substrate side polarizing plate and the CF substrate side polarizing plate 22 and the orientation directions of the liquid crystal molecules in the liquid crystal layer 40 have the appropriate relationship, so that the image display panel excellent in the display quality such as the contrast and the chromaticity is provided. Also, when the image display device 100 is viewed from the front, the generation of the deviation between the center positions of the image display panel 1, the optical member 70, and the protective member 80 and the deviation of each in the rotational direction are prevented. A size of the alignment mark 30 is appropriately selectable according to the number of the alignment marks 30. However, when the area of the alignment mark 30 is 10% or more and 25% or less with respect to an area of the outermost surface of the protective member 80, the alignment mark 30 is excellent in design.

The alignment mark 30 in the state in which the first alignment mark 31, the second alignment mark 32, the third alignment mark 33, and the fourth alignment mark 34 are superimposed is preferably formed in a non-display region of the image display device 100. In the non-display region, since the black matrix formed on the CF substrate 12 is solidly formed, it is easy to form the first alignment mark provided on the TFT substrate 11 and the CF substrate 12. Further, by forming the alignment mark 30 in the non-display region, generation of an interference fringe or luminance unevenness or the like due to the light incident on the optical member 70 from the light source is prevented, so that the image display device excellent in the display quality is provided.

OTHER EMBODIMENTS

The technology described herein is not limited to the embodiment described above and with reference to the drawings. The following embodiments may be included in the technical scope.

(1) A colored portion, a recess portion, a protrusion portion, or the like may be provided on the polarizing plate as the second alignment mark 32.

(2) A colored portion, a recess portion, a protrusion portion, or the like may be provided on the optical member as the alignment mark.

(3) The technology described herein is also applicable to a case in which, for example, a touch panel is attached to the image display panel as a member. In that case, a touch panel alignment mark alignable with the image display panel may be provided on the touch panel.

(4) In addition to the above-described embodiment, each of the outer shapes of the liquid crystal panel, the polarizing plate, the backlight device, and the protective member may be, for example, elliptical.

(5) In addition to the above-described embodiment, each of the outer shapes of the polarizing plate, the backlight device, and the protective member is non-rectangular, whereas the outer shape of the liquid crystal panel may be rectangular. On the contrary, the outer shape of the liquid crystal panel may be non-rectangular, whereas each of the outer shapes of the polarizing plate, the backlight device, and the protective member may be rectangular. Further, any one of the polarizing plate, the optical member, and the protective member may be non-rectangular, and the rest may be the rectangular.

(6) The technology described herein is also applicable to the liquid crystal panel of a normally white mode in which a pair of the polarizing plates is arranged in a parallel nicol arrangement.

(7) The image display device according to the technology described herein may be also the liquid crystal display device used for the head mounted display, the head up display, or the like. In addition, the image display device according to the technology described herein may be also the liquid crystal display device used for the on board terminal (car navigation system), the liquid crystal display device used for the radar detector, the liquid crystal display device used for a meter display of a car, or the like.

(8) The technology described herein is also applicable to, for example, an organic electroluminescence (EL) panel as the image display panel and an organic EL display device as the image display device. Specifically, the configuration of the technology described herein is applicable when the touch panel or the like as a plate member is aligned with the glass substrate constituting the organic EL panel.

The invention claimed is:

1. An image display panel comprising:
a glass substrate including a first surface and a second surface opposite from the first surface;
a plate member disposed on the second surface, at least one of the glass substrate and the plate member having a non-quadrangular outer shape;
a first alignment mark on the glass substrate; and
a second alignment mark on the plate member so as to be positioned with respect to the first alignment mark, wherein
the second alignment mark has an area that is 20% or more and 100% or less with respect to an area of the first alignment mark,
the first alignment mark and the second alignment mark are visible from a front,
the glass substrate includes a pair of glass substrates and the polarizing plates are arranged on the glass substrates, respectively,
each of the pair of polarizing plates includes the second alignment mark,
the second alignment mark provided on one of the polarizing plates is superimposed on the first alignment mark,
the second alignment mark provided on another one of the polarizing plates is superimposed on the first alignment mark and is disposed at a position adjacent to the second alignment mark provided on the one of the polarizing plates, and
the area of each of the second alignment marks is 20% or more and 50% or less with respect to the area of the first alignment mark.

2. The image display panel according to claim 1, wherein the first alignment mark is formed on the first surface.

3. The image display panel according to claim 1, further comprising an image display region and an image non-display region on an outer periphery of the image display region,
wherein the first alignment mark and the second alignment mark are formed in the image non-display region.

4. An image display device comprising:
an image display panel including
a pair of glass substrates that sandwiches a liquid crystal layer and each of which has a first surface opposite the liquid crystal layer and a second surface on an opposite side from the first surface, and
a pair of polarizing plates each of which is disposed on the second surface of each glass substrate; and
an optical member that is disposed on one of the polarizing plates on an opposite side from the glass substrate, wherein
each of the glass substrates includes at least one first alignment mark,
each of the polarizing plates includes at least one second alignment mark so as to be positioned with respect to the first alignment mark,
the optical member includes a third alignment mark so as to be positioned with respect to the first alignment mark and the second alignment mark,
the second alignment mark has an area that is 20% or more and 100% or less with respect to an area of the first alignment mark, and
the first alignment mark, the second alignment mark, and the third alignment mark are visible from a front.

5. The image display device according to claim 4, wherein the third alignment mark has an area that is 50% or more and 100% or less with respect to the area of the first alignment mark.

6. The image display device according to claim 4, wherein
the second alignment mark provided on one of the polarizing plates is superimposed on the first alignment mark and the third alignment mark, and
the second alignment mark provided on the other one of the polarizing plates is superimposed on the first alignment mark and the third alignment mark and disposed at a position adjacent to the second alignment mark provided on the one of the polarizing plates.

7. The image display device according to claim 4, wherein
the third alignment mark has an area that is 50% or more and 100% or less with respect to the area of the first alignment mark,
the area of the second alignment mark is 50% or more and 100% or less with respect to the area of the third alignment mark, and
the area of the first alignment mark is largest as compared with the areas of the second alignment mark and the third alignment mark.

8. The image display device according to claim 4, wherein the first alignment mark and the third alignment mark have a same shape and a same area.

9. The image display device according to claim 4, further comprising a protective member being opposite the image display panel and having a fourth alignment mark that can be positioned with respect to the first alignment mark,
wherein the optical member, the image display panel, and the protective member are layered in this order.

10. The image display device according to claim 9, wherein
each of the glass substrates has an image display region and an image non-display region on an outer periphery of the image display region,
the first alignment mark, the second alignment mark, the third alignment mark, and the fourth alignment mark are formed in the image non-display region, and the first alignment mark, the second alignment mark, the third alignment mark, and the fourth alignment mark are visible from a front.

11. The image display device according to claim 9, wherein the fourth alignment mark is formed by processing a surface of the protective member.

* * * * *